United States Patent
Tajima et al.

(10) Patent No.: US 8,328,399 B2
(45) Date of Patent: Dec. 11, 2012

(54) TURN SIGNAL DEVICE FOR SADDLE-RIDE TYPE VEHICLE

(75) Inventors: Katsuki Tajima, Wako (JP); Takashi Sumada, Wako (JP); Tomonori Hayashi, Wako (JP); Taiki Sakane, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 12/982,052

(22) Filed: Dec. 30, 2010

(65) Prior Publication Data
US 2011/0167952 A1    Jul. 14, 2011

(30) Foreign Application Priority Data
Jan. 8, 2010   (JP) ................................ 2010-002797

(51) Int. Cl.
*F21V 33/00*   (2006.01)
(52) U.S. Cl. ......... 362/473; 362/474; 362/498; 362/540
(58) Field of Classification Search .................. 362/473, 362/474, 540, 498
See application file for complete search history.

(56) References Cited

U.S. PATENT DOCUMENTS

| | | | |
|---|---|---|---|
| 7,137,722 B2* | 11/2006 | Uemoto et al. | 362/473 |
| 7,401,953 B2* | 7/2008 | Isayama | 362/474 |
| 7,537,362 B2* | 5/2009 | Kushida et al. | 362/473 |
| 7,604,382 B2* | 10/2009 | Ohira et al. | 362/476 |
| 2007/0025114 A1* | 2/2007 | Isayama | 362/474 |
| 2007/0228764 A1* | 10/2007 | Shimizu et al. | 296/78.1 |
| 2008/0047820 A1* | 2/2008 | Okatani et al. | 200/559 |

FOREIGN PATENT DOCUMENTS

JP    62-176902    11/1987

\* cited by examiner

*Primary Examiner* — Ali Alavi
(74) *Attorney, Agent, or Firm* — Squire Sanders (US) LLP

(57) ABSTRACT

A saddle-ride type vehicle has a handlebar cover 27 covering at least a front portion of a handlebar 14. The vehicle includes a turn signal device having mounting stays 26 jointed to the handlebar bar 14, and lamp members 25 supported on the mounting stays 26. The handlebar cover 27 covering the front portion of the handlebar 14 has opening portions 47 formed so as to face in a vehicle body forward direction. The mounting stays 26 penetrate the opening portions 47 and extend in the vehicle body forward direction from the handlebar 14. The lamp members 25 are connected to front end portions of the mounting stays 26. The mounting stays 26 are jointed to end portions 14c of the handlebar 14. Stay covers 45 which cover the mounting stays 26 can be provided.

19 Claims, 10 Drawing Sheets

TURN SIGNAL DEVICE FOR SADDLE-RIDE TYPE VEHICLE

BACKGROUND

1. Field

Embodiments of this invention relate to a turn signal device of a saddle-ride type vehicle which is attached to a handlebar and, more particularly, to a turn signal device of a saddle-ride type device which is suitable for enhancing visibility and functionality.

2. Description of the Related Art

Regarding a turn signal device that is provided at a saddle-ride type vehicle (typically, a motorcycle), various attaching structures have been used. For example, a turn signal device described in Patent Literature 1 (JPU No. S62-176902) has a structure in which turn signals or winker lamps (lamp members) are attached to tip ends of support arms which are extended outward in a vehicle body width direction relative to lamp mounting stays that are fixed to a handlebar.

In the meantime, when attention is given to a design of the turn signal device attached to the handlebar as described in the Patent Literature 1, the mounting stays and the support arms are noticeable when viewed from a vehicle body front, and it may not be said that a preferable or desirable design is made. It is conceivable that, particularly, in order to better recognize from the vehicle body front which of the left and right winker lamps is biased (namely, in order to enhance visibility of the winker lamps), the support arms are made longer and a spacing between the left and right winker lamps is made larger. However, if this is done, the support arms become more noticeable. Thus, a structure which allows the visibility to be enhanced while allowing a design property of the turn signal device to be enhanced is desired.

SUMMARY

An object of the present invention is to provide a turn signal device of a saddle-ride type vehicle which can make high visibility and a preferable design compatible with each other, with reference to the problem of the above-mentioned related art.

The invention, in one embodiment, therefore includes a saddle-ride type vehicle, which comprises a handlebar having a handlebar grip mounted on either end thereof. A handlebar cover covers at least a front portion of the handlebar. The handlebar cover comprises a mounting stay jointed to the handlebar, and a lamp member supported on the mounted stay. The handlebar cover includes an opening portion formed so as to face in a vehicle body forward direction. The mounted stay is partially covered by the handlebar cover, and penetrates the opening portion of the handlebar cover. The mounting stay extends, in the vehicle body forward direction, from the handlebar. The lamp member is connected to a front end portion of the mounting stay.

Embodiments of the present invention can have a second aspect, in which the handlebar is composed of a center portion, rising-up portions rising up from the center portion in left and right upper directions, and end portions extending to left and right in a vehicle body width direction from the rising-up portions. The handlebar grips are mounted on the end portions, and the mounting stays are jointed to the end portions of the handlebar.

Embodiments of the present invention can have a third aspect, in which the lamp members are attached to the mounting stays in such a manner to be deflected outward in the vehicle body width direction.

Embodiments of the present invention can have a fourth aspect, in which the vehicle has switch boxes provided adjacent the handlebar grips on the handlebar. End portions of the handlebar cover in the vehicle body width direction can extend to positions where they are at least partially overlapped on the switch boxes as viewed in a front view of the vehicle. The lamp members are positionally set so as to be overlapped on at least parts of the switch boxes and the end portions of the handlebar cover in the vehicle body width direction, as viewed in the front view of the vehicle.

Embodiments of the present invention can have a fifth aspect, in which portions of the mounting stays which project outward from the handlebar cover extend linearly along a traveling direction of the vehicle as viewed in a plan view.

Embodiments of the present invention can have a sixth aspect, in which the opening portions of the handlebar cover are formed so as to be positioned in a front lower portion relative to the handlebar.

Embodiments of the present invention can have a seventh aspect in which the mounting stays are composed of arm portions having ends joined to the handlebar and the other ends penetrating the opening portions and projecting in the vehicle body forward direction. Supporting plate portions can be fixed to the other ends of the arms and abutting on side surfaces of the lamp members, and parts of the supporting plate portions are configured so as to be overlapped on the handlebar cover as viewed in a plane view. In an eighth aspect, the arm portions are rod-shaped members.

Embodiments of the present invention can have a ninth aspect, in which the turn signal device includes stay covers covering the portions of the mounting stays which project in the vehicle body forward direction from the handlebar cover. The stay covers can have end portions that tightly contact edges of the opening portions so as not to produce a clearance between the edges and the end portions and are wound toward a back surface of the cover.

Embodiments of the present invention can have a tenth aspect, in which the stay covers have end surfaces abutting on the lamp members.

The present invention can also have an eleventh aspect, in which the lamp members includes housings and lenses attached to front portions of the housings. Nuts, into which bolts that penetrate the supporting plate portions of the mounting stays are threadedly fitted, are retained in the housings of the lamp members by integral forming. In a twelfth aspect, the stay covers can be formed of rubber.

In another embodiment, the invention can include a turn signal device of a vehicle. The turn signal device can include lamp means for being selectively illuminated, mounting means attached to the lamp means. The mounting means are for mounting said lamp means, and the mounting means are configured to be attached to a handlebar of the vehicle via a mounting stay which penetrates a handlebar cover.

According to the present invention having the above-mentioned aspects, the mounting stays penetrate the opening portions of the handlebar cover and extend in the vehicle body forward direction from the handlebar and the lamp members are connected to the front end portions of the mounting stays. As a result, regions in which the mounting stays are covered by the handlebar cover can be changed according to positions of the opening portions in a vehicle body forward/rearward direction. For example, the opening portions are arranged so as to be adjacent the vehicle body forward direction, whereby the great portions of the mounting stays can be housed inside the handlebar cover. In a case where the mounting stays are modified in order that visibility of the lamp members is enhanced and arranging places of the lamp members are changed, the mounting stays can be covered by the handlebar cover, so that the degree of freedom in a design can be also increased. Therefore, it is possible to ensure visibility of the lamp members of the turn signal device while concealing the mounting stay and enhancing a design property.

Particularly, according to the second aspect of the present invention, it is possible to position the lamp members in a higher place of the handlebar and more outward in the vehicle body width direction, so that visibility of turn signals can be enhanced.

According to the third aspect of the present invention, the lamp members are deflected more outward in the vehicle body width direction than the attaching positions of the mounting stays, whereby an interval between the left and right lamp members is more increased and the visibility of the turn signals can be more enhanced.

According to the fourth aspect of the present invention, the lamp members are positioned at boundary portions between the handlebar cover and the switch boxes, whereby the boundary portions can be partially concealed as viewed in a front view, so that the design property can be enhanced.

According to the fifth aspect of the present invention, ranges in which the mounting stays are visible as viewed in the front view are reduced, so that the mounting stays are not so visibly intrusive, and the design is enhanced.

According to the sixth aspect of the present invention, the opening portions of the handlebar cover are formed so as to be positioned in the lower forward direction, so that the mounting stays extend in the vehicle body forward direction. By this, even if the handlebar is greatly turned in a structure in which the space between the left and right lamp members is increased, an amount of approaching of the lamp members relative to a rider side is decreased, so that a space for a rider's footboard is easy to be obtained.

According to the seventh aspect of the present invention, the supporting plate portions that are tip end portions of the mounting stays are also covered by the handlebar cover, the design property as viewed from the rider is enhanced by making the great portions of the mounting stays invisible from the rider, and, at the same time, parts of the mounting plate portions and the lamp members are not made concealed by the handlebar cover, so that the rider can easily confirm a turn signal state.

According to the eighth aspect, the mounting stays can have rod-shapes, so that a plurality of harnesses wired inside the handlebar cover can be prevented from being damaged.

According to the ninth aspect of the present invention, the stay covers can be tightly contacted with the opening portion edges of the handlebar cover and the end portions of the stay covers are bent toward the back surface of the handlebar cover, so that water or dust can be prevented from entering inside the handlebar cover from the opening portions. The portions of the mounting stays of the lamp members which are exposed from the handlebar cover are covered with the stay covers, so that it is possible to enhance the design without allowing the mounting stays to be exposed.

According to the tenth aspect of the present invention, the ends of the stay covers can be tightly contacted with the opening portions of the handlebar cover and the other ends abut on the lamp members, so that it is possible to more positively prevent the entering of water or dust and, at the same time, absorb vibration of the lamp members by the stay covers and thus reduce vibration.

According to the eleventh aspect of the present invention, the nuts can be fixed to lamp member sides, so that it is possible to attach the lamp members to the mounting stays by screwing the bolts from mounting stay sides, without separately holding or securing the nuts.

According to the twelfth aspect of the present invention, the stay covers are flexible or elastic rubber, so that even after the lamp members are fixed to the mounting stays by the bolts, it is possible to put the stay covers on the tip end portions of the mounting stays including the bolts. Moreover, the absorption of the vibration which has been explained with respect to the tenth aspect can be performed better by the rubber stay covers.

According to a thirteenth aspect of the present invention, it is possible to wire the harnesses without supportingly fixing the harnesses to the mounting stays, and assembling is made easy.

DESCRIPTION OF EMBODIMENT

Figure 1:
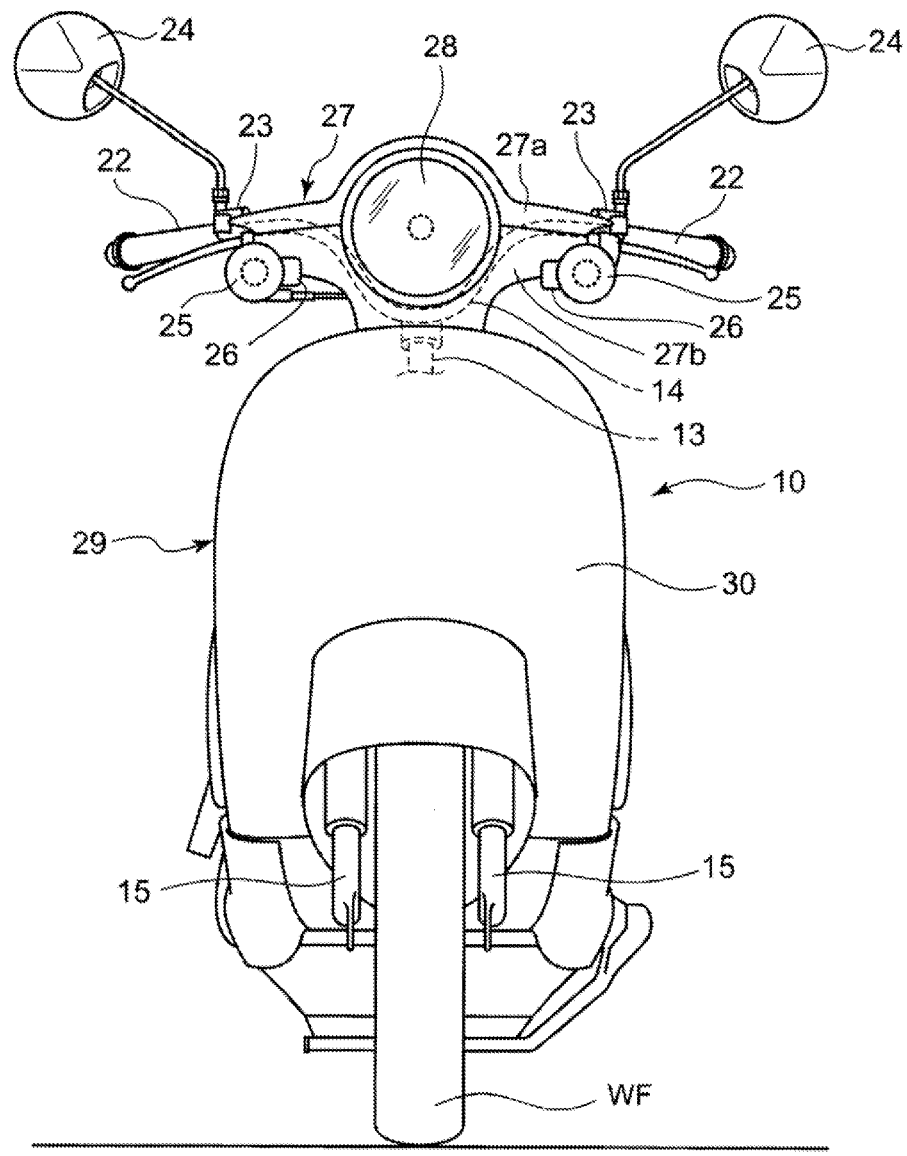
FIG. 1 is a front view of a motorcycle provided with a turn signal device according to an embodiment of the present invention.
Figure 2:
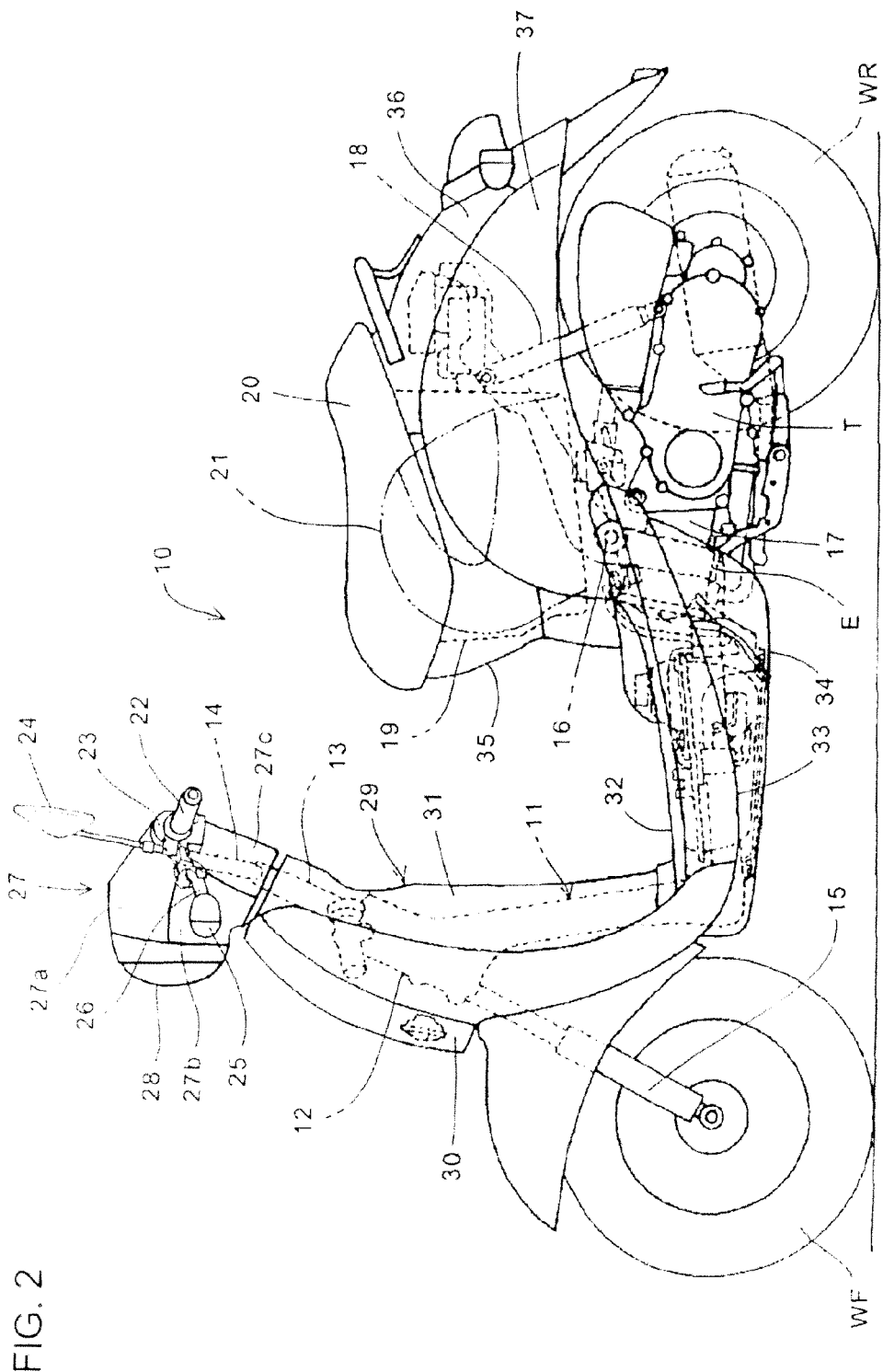
FIG. 2 is a side view of the motorcycle provided with the turn signal device according to an embodiment of the present invention.

Embodiments of the present invention will be explained hereinafter with reference to the drawings. FIG. 1 is a front view of a motorcycle as a saddle-ride type vehicle provided with a turn signal device according to an embodiment of the present invention. FIG. 2 is a side view of the same. The motorcycle 10, in this example, is a scooter-type vehicle includes a steering axis 13 that vertically penetrates a head pipe 12 constituting a front section of a vehicle body frame 11 and is rotatably supported by the head pipe. A handlebar 14 and a front fork 15 branching to the left and right of a vehicle body are jointed to an upper portion and a lower portion of the steering axis 13, respectively. A front wheel WF is rotatably supported on a lower end of the front fork 15.

A power unit 17 which includes an engine such as a water-cooled type four cycle engine E and a centrifugal clutch-attached belt-type continuously variable transmission T is vertically swingably coupled to a rear section of the vehicle body frame 11 by a pivot axis 16. An output axis (not shown) of the power unit 17 is connected to a rear wheel WR. A rear end section of the power unit 17 is connected to the rear section of the vehicle body frame 11 by a rear cushion unit 18. A storage box or luggage box 19, which forms a space suitable to store a helmet 21 or the like, is attached to an upper portion of the rear section of the vehicle body frame 11. A seat 20 which can be used as a lid for the storage box 19 is provided above the storage box 19.

On left and right tip end portions of the handlebar 14, handlebar grips 22 are provided and left and right switch boxes 23 are provided adjacent the left and right handlebar grips 22. Moreover, left and right mirrors 24 are standingly provided at the left and right switch boxes 23, respectively.

Moreover, left and right winker lamps or turn signals, i.e., lamp members 25 of the turn signal device are attached to the handlebar 14 through mounting stays 26. A circumference of the handlebar 14 except the left and right ends thereof is covered by a handlebar cover 27. The handlebar cover 27 is composed of a front upper portion 27a, a front lower portion 27b, and a rear portion 27c. A head light 28 is provided at a front section of the handlebar cover 27.

The vehicle body frame 11 is covered by a body cover 29. The body cover 29 is composed of a front cover 30 covering a front portion of the head pipe 12, a leg shield 31 covering the front cover 30 from a rearward direction of the head pipe 12 and provided so as to be positioned in front of legs of a rider. A step floor (low-floor type footboard) 32 on which the rider puts his/her feet. A pair of left and right floor side covers 33 extending downward from an outer edge of the step floor 32. An undercover 34 covers lower edges of the floor side covers 33, and a seat lower portion cover 35 covers a lower peripheral front portion of the seat 20. A rear cover 36 and left and right side covers 37 covers a lower rear part of the seat 20 and an upper part of the rear wheel WR.

Figure 3:
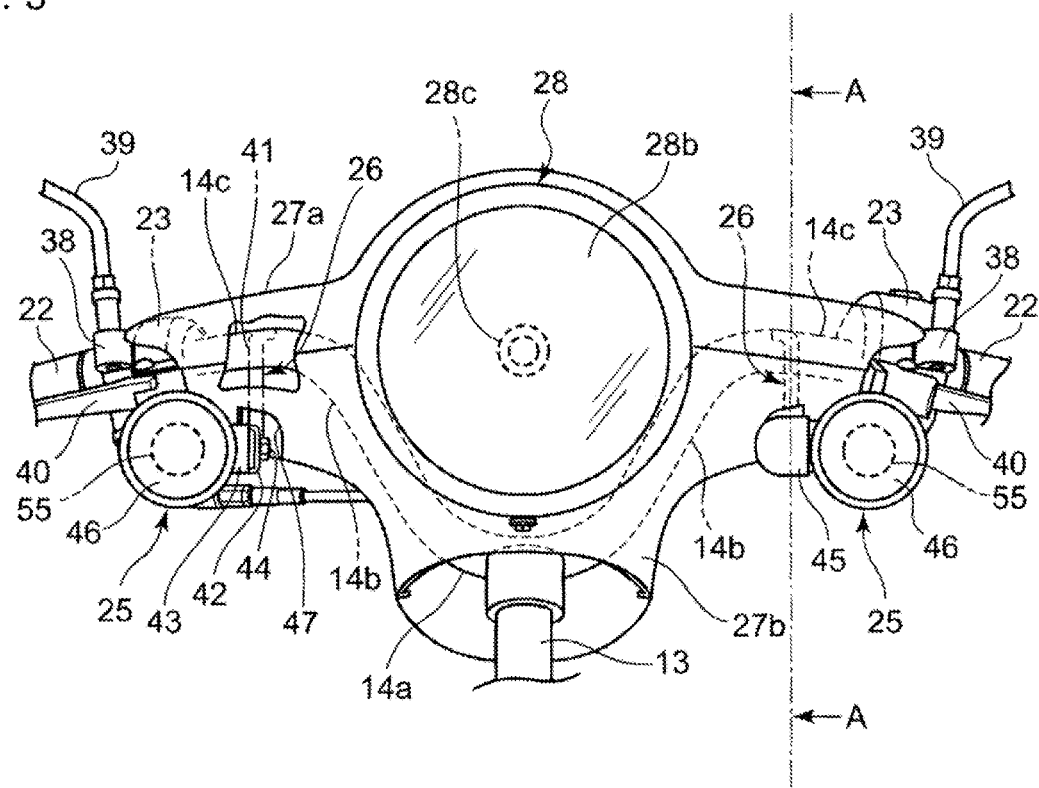
FIG. 3 is a front view of a circumference of a handlebar of the motorcycle provided with the turn signal device according to an embodiment of the present invention.
Figure 4:
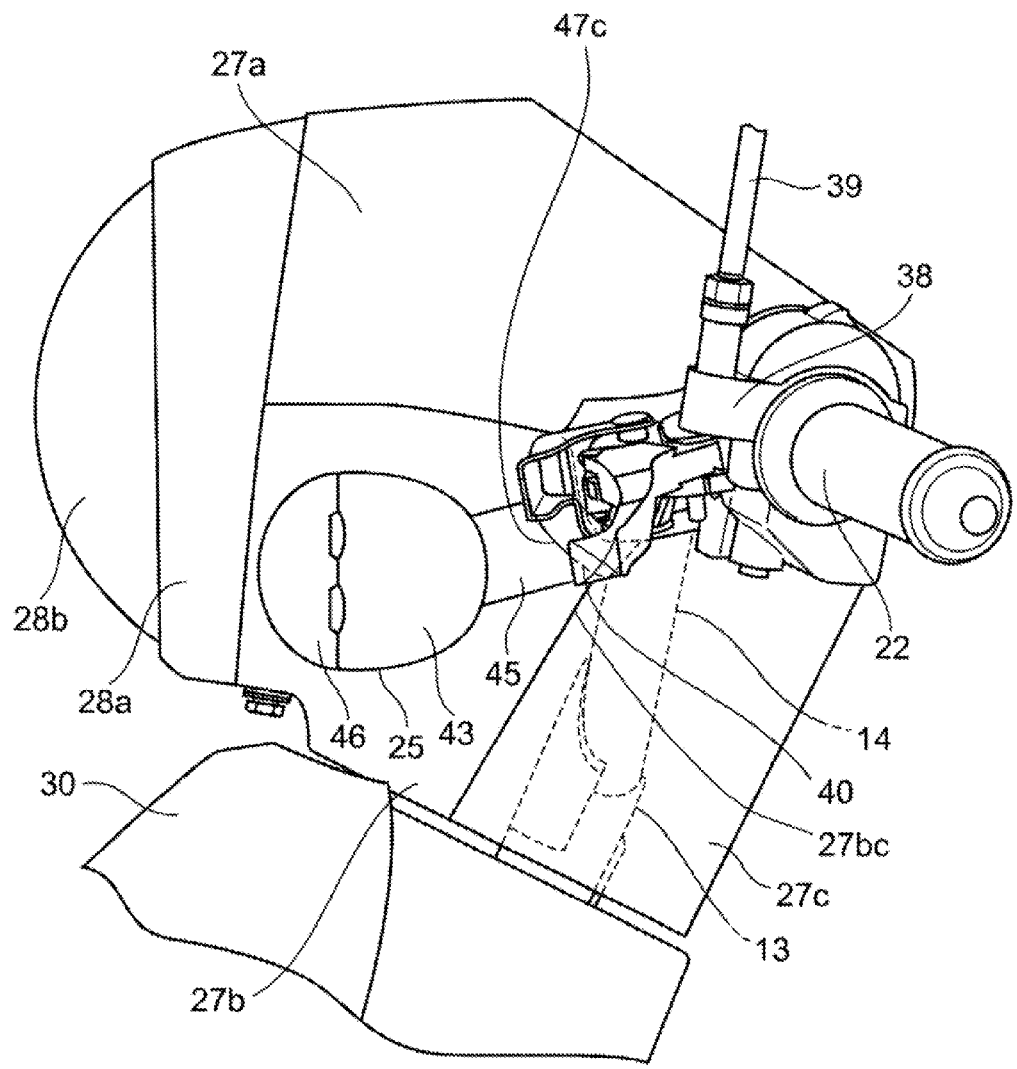
FIG. 4 is a left side view of the circumference of the handlebar of the motorcycle provided with the turn signal device according to an embodiment of the present invention.
Figure 5:
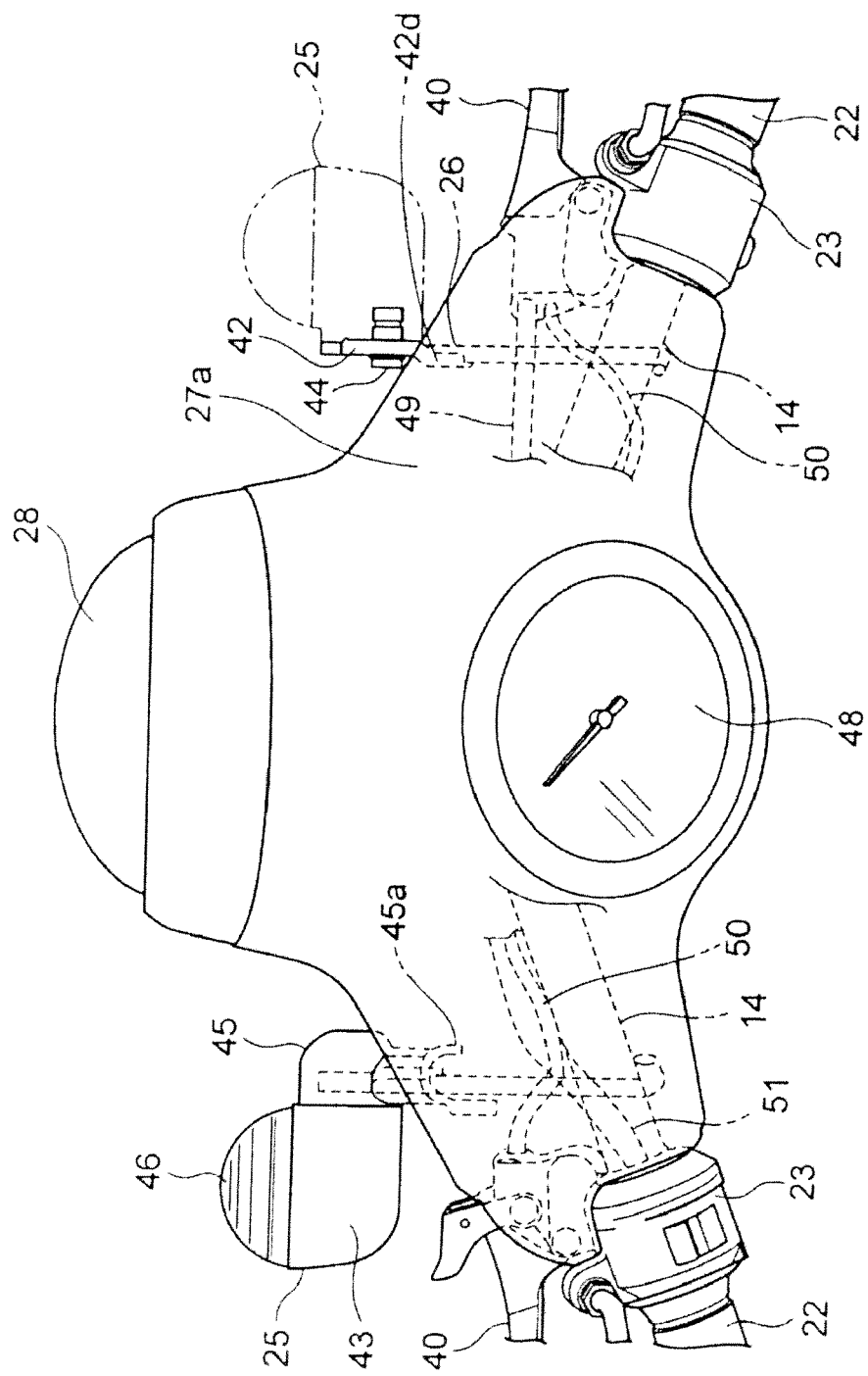
FIG. 5 is a plan view of the circumference of the handlebar of the motorcycle provided with the turn signal device according to an embodiment of the present invention.

A structure around the handlebar to which the turn signal device is attached will be explained. FIG. 3 is a front view of the circumference of the handlebar, FIG. 4 is a left side view of the same, and FIG. 5 is a plane view of the same. In FIG. 3, the handlebar 14 is composed of a pipe which is curvedly formed in such a manner that a center portion thereof is located in a lower position and end portions thereof are located in a higher position. Namely, the handlebar 14 is composed of the center portion 14a, rising-up portions 14b rising up from the center portion 14a in left and right upper directions, and the end portions 14c extending to the left and right in a vehicle body width direction from the rising-up portions 14b. The upper portion of the steering axis 13 is jointed to the center portion 14a.

On the end portions 14c of the handlebar 14, the handlebar grips 22 are mounted and switch boxes 23 are mounted adjacent a center side in the left and right direction of the vehicle body relative to the handlebar grips 22. A winker switch, a hazard switch, a dimmer switch, a horn switch, and the like are provided in the left switch box 23. A starting switch, an engine stop switch, and the like are provided in the right switch box 23. All of the switches have well-known structures and do not relate to an essential part of the present invention, so that illustration and reference signs of them are omitted. Support poles 39 for the mirrors 24 are threadedly mounted to protruding portions 38 which are formed at front portions of the switch boxes 23. Moreover, brake levers 40 are attached to the front portions of the switch boxes 23.

The mounting stays 26 for the lamp members 25 are jointed to the handlebar 14. The mounting stays 26 are composed of arm portions 41 welded to positions adjacent the switch boxes 23 on the end portions 14c of the handlebar 14, and supporting plate portions 42 to which the lamp members 25 are jointed. Portions of the mounting stays 26 which project outward from the handlebar cover 27 extend linearly along a traveling direction of the vehicle, as viewed in the plane view. According to this layout of the mounting stays 26, ranges in which the mounting stays 26 are visible as viewed in the front view are reduced, so that the mounting stays 26 become hard to be noticeable and a design property is enhanced. The arm portions 41 are formed of round bar materials. It is desirable that the supporting plate portions 42 are formed of plate materials in order that the lamp members 25 are bolt-fastened and jointed to the supporting plate portions 42 so as to be correctly oriented to predetermined directions.

The mounting stays 26 project in a slightly downward facing and forward direction from the handlebar 14. The lamp members 25 are attached to the supporting plate portions 42 formed of flat plates, by screwing bolts 44 into their housings (lamp member housings) 43. It is desirable that the mounting stays 26 are covered by stay covers 45 which are made of flexible or elastic material such as rubber. In FIGS. 3 and 5, the mounting stay 26 on the right side of the vehicle body is illustrated in a state where the stay cover 45 is removed, and the mounting stay 26 on the left side of the vehicle body is illustrated in a state where the stay cover 45 is attached to it.

As shown in FIG. 3, end portions of the handlebar cover 27 in the vehicle body width direction, i.e., left and right end portions extend to positions where at least parts of them are overlapped on the switch boxes 23 as viewed in the front view of the vehicle. Under the handlebar cover, the lamp members 25 are positionally set so as to be overlapped on at least parts of the switch boxes 23 and the end portions of the handlebar cover 27 in the vehicle body width direction, as viewed in the front view of the vehicle. According to this positional setting, the lamp members 25 are positioned at boundary portions between the handlebar cover 27 and the switch boxes 23, so that the boundary portions can be partially concealed as viewed in the front view and the design property can be enhanced.

Bulbs 55 which are provided with reflectors are housed within the housings 43 of the lamp members 25. Lenses 46 are provided at front surfaces of the housings 43. A mode of jointing the mounting stays 26 to the handlebar 14 and a mode of attaching the lamp members 25 to the mounting stays 26 will be further described below.

The front lower portion 27b of the handlebar cover 27 is formed with a notch 47c (refer to FIG. 4) which faces upward from a mating portion 27bc relative to the rear portion 27c and constitutes an opening portion 47 together with an upper edge of the rear portion 27c. The mounting stay 26 penetrates the opening portion 47 and extends in the vehicle body forward direction. Incidentally, an outline shape of the opening portion 47 (edge shape) is set so as to allow an outer peripheral surface of the stay cover 45 covering the mounting stay 26 to be tightly engaged with the opening portion.

A meter unit 48 which is provided with an instrument such as a speedometer is attached onto an upper surface of the front upper portion 27a of the handlebar cover 27 (refer to FIG. 5). The head light 28 is provided with a head light housing 28a engaging the front upper portion 27a and a front part of the front lower portion 27b of the handlebar cover 27, and a lens 28b provided at a front part of the head light housing 28a. A head light bulb 28c and an unshown reflector are arranged in a space surrounded by these head light housing 28a and lens.

Figure 6:
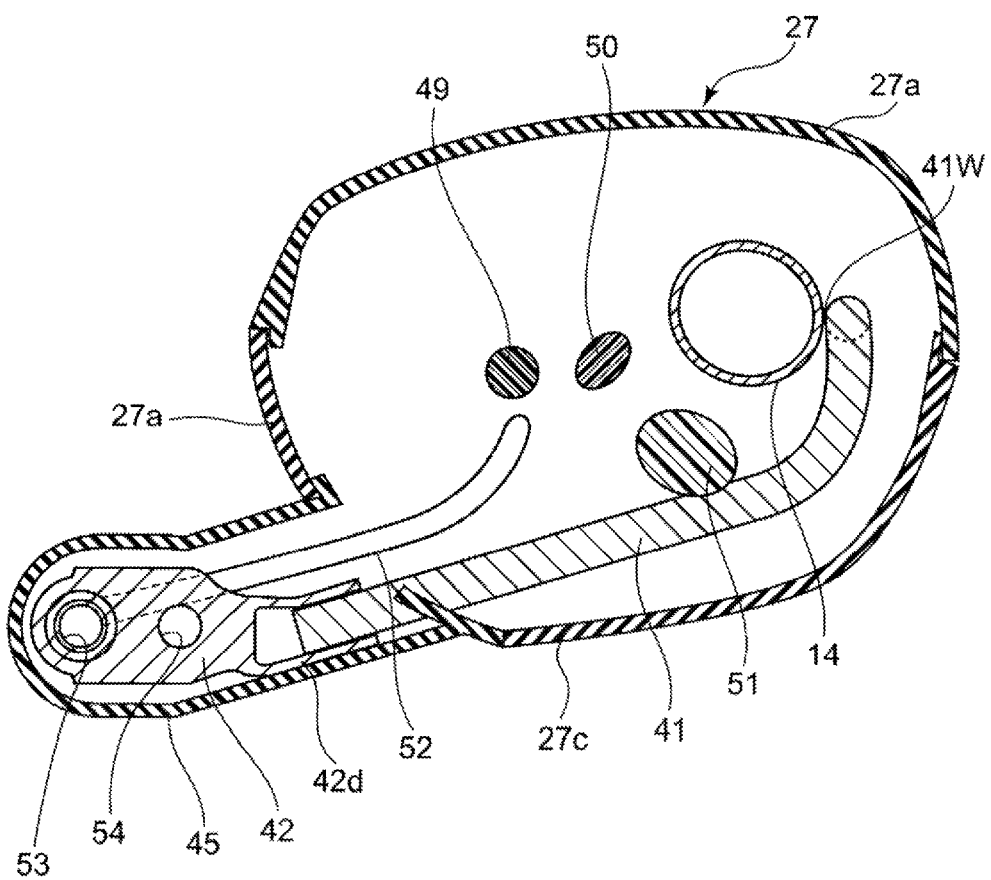
FIG. 6 is a sectional view taken at a position A-A in FIG. 3.
Figure 7:
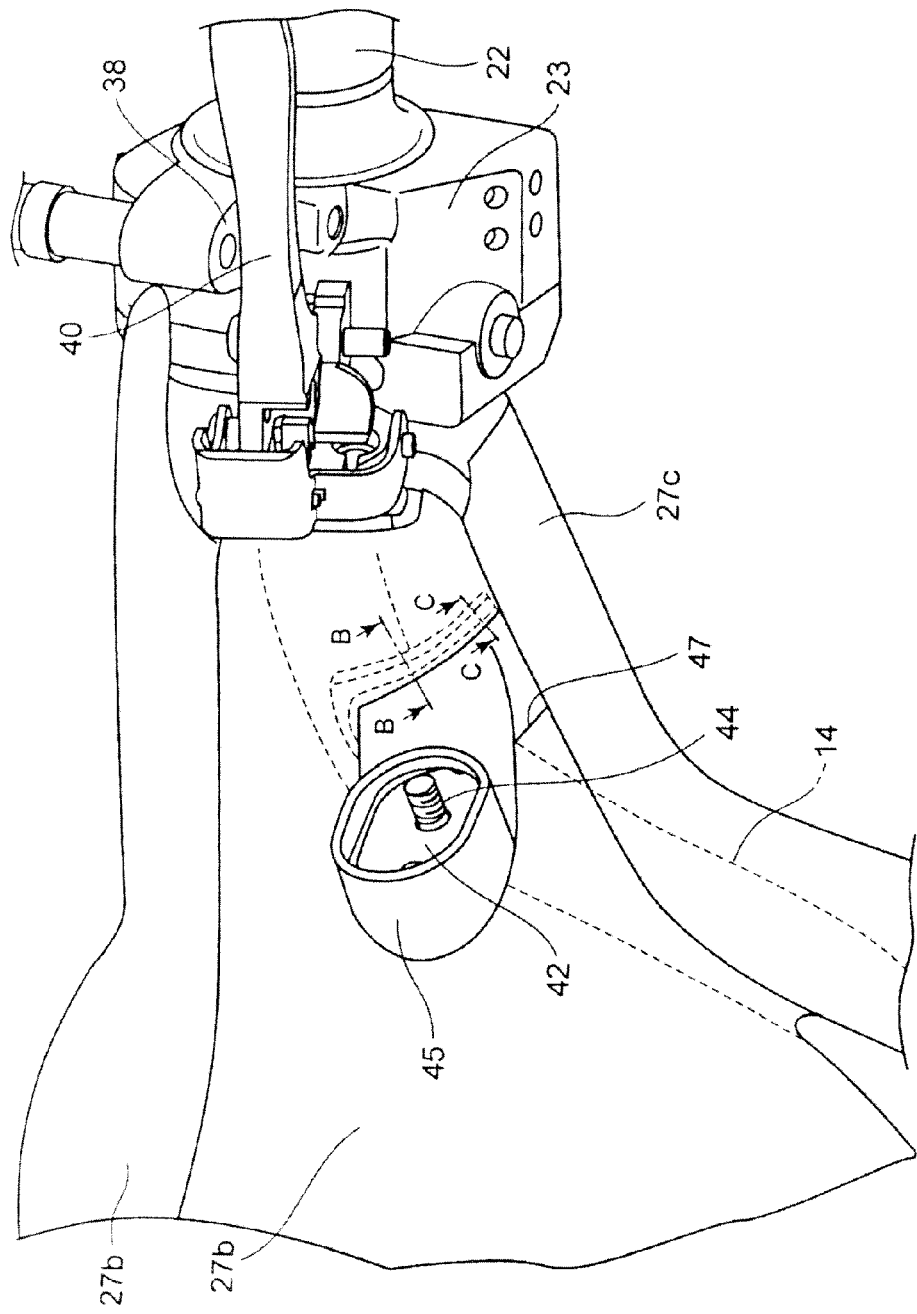
FIG. 7 is a perspective view of the circumference of the handlebar that includes a mounting stay having a stay cover.

Next, the mode of attaching the lamp members 25 will be explained in detail. FIG. 6 is a sectional view taken at a position A-A in FIG. 3 and FIG. 7 is a perspective view of the circumference of the handlebar including the mounting stay 26 which has the stay cover, as viewed from the left forward and downward direction. In FIGS. 6 and 7, the arm portion 41 of the mounting stay 26 jointed to the handlebar 14 extends downward from a welded portion 41W relative to the rear side of the handlebar 14, further extends in the vehicle body forward direction, penetrates the opening portion 47 of the front lower portion 27b of the handlebar cover 27, and projects in the forward direction of the handlebar cover 27. A part of the supporting plate portion 42, i.e., a connection portion 42d relative to the arm portion 41 is positioned so as to be overlapped on a front edge of the handlebar cover 27 as viewed in the plane view.

Within the handlebar cover 27, a brake wire 49, a brake switch harness 50, a handlebar switch harness 51, and a winker harness (a turn signal device harness) 52 are wired. The arm portion 41 has a circular rod-shape in cross-section, so that even if it is buffered by a tube of the brake wire 49, the winker harness 52, or the like, there is no possibility of damaging them.

The winker harness 52 is inserted through a harness through-hole 53 pierced in the supporting plate portion 42, and extended to the bulb (described below) in the lamp member 25 fixed to the supporting plate portion 42. The supporting plate portion 42 is formed with a bolt through-hole 54 through which a bolt 44 is inserted, as well as the harness through-hole 53. The stay cover 45 covering the mounting stay 26 covers a tip end portion of the arm portion 41 and the supporting plate portion 42 and at the same time tightly engages the handlebar cover 27 (the front lower portion 27b and the rear portion 27c) so as not to produce a clearance between the stay cover and the opening portion 47 formed in the handlebar cover 27.

As shown in FIG. 7, the bolt 44 is penetrated through the bolt through-hole 54 from the center side in the vehicle body width direction, projects at a tip end thereof to the housing 43 side of the lamp member 25, and threadedly fitted in a nut (described below) which is embedded in the housing 43. When the bolt 44 is fastened into the lamp member 25, the fastening can be performed in a state where the stay cover 45 formed of the flexible or elastic material such as rubber is turned over and the supporting plate portion 42 including the bolt 44 is exposed.

Figure 8:
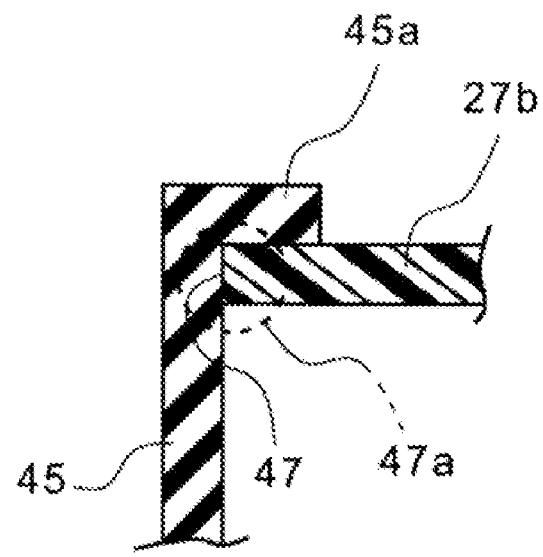
FIG. 8 is a sectional view taken at a position B-B in FIG. 7.
Figure 9:
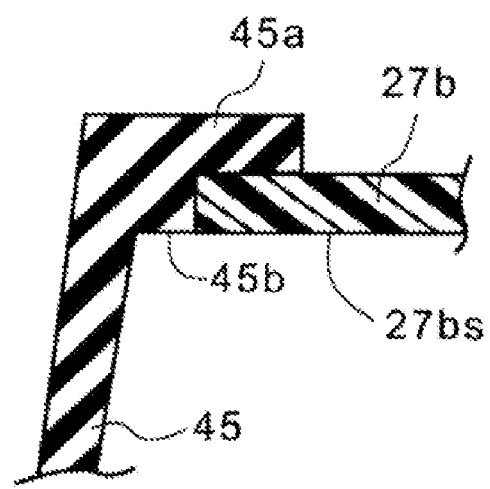
FIG. 9 is a sectional view taken at a position C-C in FIG. 7.

FIGS. 8 and 9 are sectional views illustrating an engaged portion between the opening 47 and the stay cover 45, and a sectional view taken at a position B-B in FIG. 7 and a sectional view taken at a position C-C in FIG. 7, respectively. In FIG. 8, the stay cover 45 is tightly contacted with an edge 47a of the opening portion 47 of the front lower portion 27b of the handlebar cover 27 so as not to produce a clearance therebetween, and has an end portion 45a wound toward a back surface of the handlebar cover 27.

Moreover, at the portion shown in FIG. 9, the end portion 45a of the stay cover 45 has a portion wound toward the back surface of the handlebar cover 27 and a continuous planar surface 45b flush with an outer surface 27bs of the front lower portion 27b of the handlebar cover 27.

Figure 10:
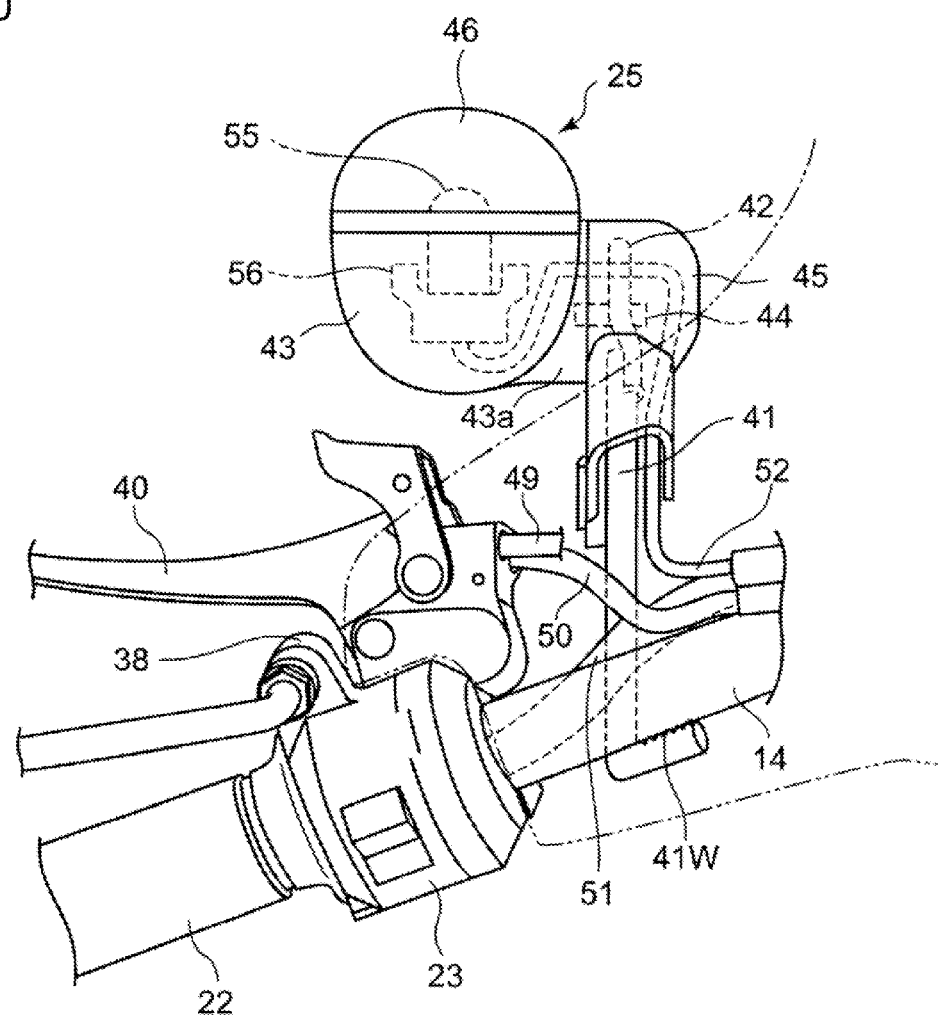
FIG. 10 is a perspective view of a lamp member of the turn signal device.
Figure 11:
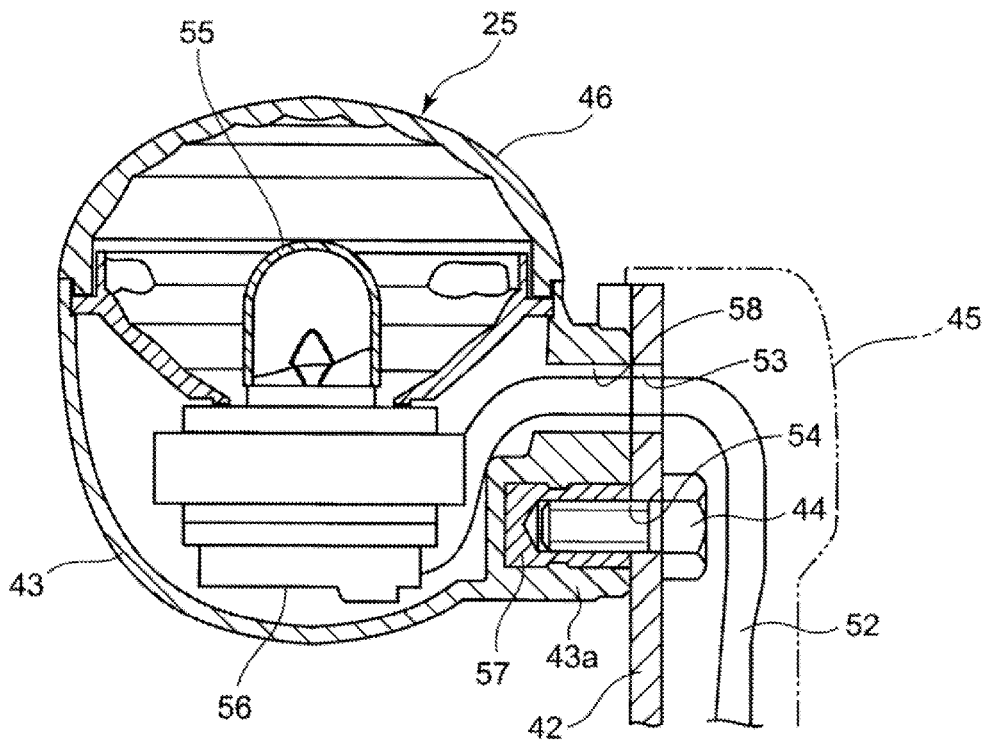
FIG. 11 is a sectional view of the lamp member of the turn signal device.

FIG. 10 is a perspective view of the lamp member 25 and FIG. 11 is a sectional view of the lamp member 25. In FIG. 10, the arm portion 41 of the mounting stay 26 penetrates inside the stay cover 45 in a vehicle body rearward direction, extends to the handlebar 14, is wound toward the vehicle body rear side, and extends to a position adjacent the center in the vehicle body width direction along the longitudinal direction of the handlebar 14. A curved end portion which extends to the position adjacent the center in the vehicle body width direction is welded to the handlebar 14.

One end of the winker harness 52 is led toward the handlebar 14 side from the vehicle body rear side of the stay cover 45 and bundled together with the brake switch harness 50 and the handlebar switch harness 51. The other end of the winker harness 52 passes inside the stay cover 45, extends to the supporting plate portion 42 side, passes the harness through-hole 53 of the supporting plate portion 42, and is jointed to a socket 56 for the winker bulb 55.

In FIG. 11, a through-hole 58 which corresponds to the harness through-hole 53 is pierced in a side thicker portion 43a of the housing 43, and a nut 57 into which the bolt 44 is threadedly fitted is integrally embedded in, for example, the side thicker portion 43a of the housing 43 by insert molding.

Figure 12:
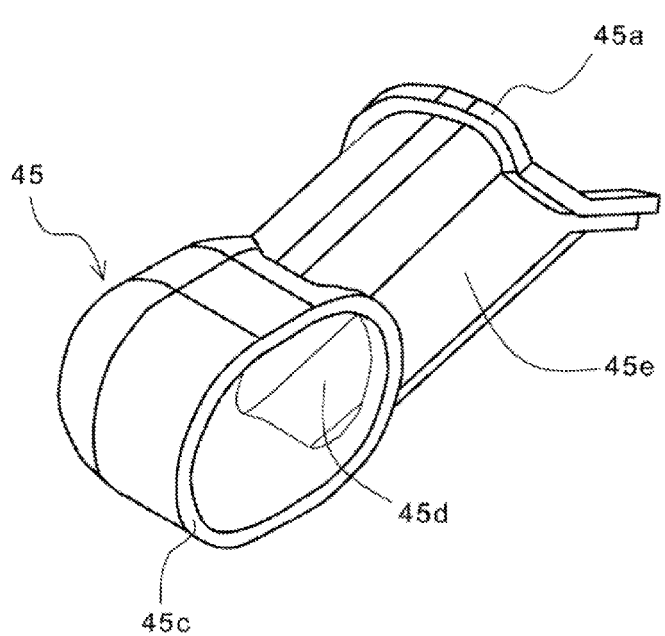
FIG. 12 is a perspective view of the stay cover.

FIG. 12 is a perspective view of the stay cover 45. The stay cover 45 covers the supporting plate portion 42 of the mounting stay 26, and is composed of a surface 45c abutting on the housing 43 of the lamp member 25, a sleeve 45e having a hole 45d through which the arm portion 41 and the winker harness 52 are penetrated, and the end portion 45a engaging the handlebar cover 27.

In the turn signal device according to the above-mentioned embodiment, the great portions of the mounting stays 26 of the lamp members 25 can be concealed by the handlebar cover 27 and, in addition, the entire mounting stays 26 can be concealed by the stay covers 45.

Incidentally, the stay covers 45 are optional and are not indispensable. In the case where the stay covers 45 are provided, they are not limited to stay covers which cover the entire mounting stays 26, and they may be parts which cover the engaged portion sides only between the opening portions 47 of the handlebar covers 27 and the mounting stays 26.

LEGEND

10 ... Motorcycle,
13 ... Steering axis,
14 ... Handlebar,
22 ... Handlebar grip,
23 ... Switch box,
25 ... Lamp member (Winker lamp),
26 ... Mounting stay,
27 ... Handlebar cover,
28 ... Head light,
29 ... Body cover,
41 ... Arm portion,
42 ... Supporting plate portion,
43 ... Lamp member housing,
44 ... Bolt,
45 ... Stay cover,
47 ... Opening portion,
53 ... Harness through-hole,
54 ... Bolt through-hole,
57 ... Nut

We claim:

1. A saddle-ride type vehicle, said saddle-ride type vehicle comprising:
   a handlebar having a handlebar grip mounted on either end thereof; and
   a handlebar cover covering at least a front portion of the handlebar, the handlebar cover comprising a mounting stay jointed to the handlebar and a lamp member supported on the mounting stay,
   wherein the handlebar cover includes an opening portion formed so as to face in a vehicle body forward direction, the mounting stay is partially covered by the handlebar cover, penetrates the opening portion of the handlebar cover and extends, in the vehicle body forward direction from the handlebar, and wherein the lamp member is connected to a front end portion of the mounting stay.

2. The saddle-ride type vehicle according to claim 1, wherein the handlebar comprises a center portion, a rising-up portion rising up from the center portion in each of left and right upper directions, and an end portion extending to each of left and right in a vehicle body width direction from the rising-up portion,
wherein the handlebar grip is mounted on the end portion, and wherein the mounting stay is jointed to the end portion (14*c*) of the handlebar.

3. The saddle-ride type vehicle according to claim 1, wherein the lamp member is attached to the mounting stay in such a manner to be deflected outward in the vehicle body width direction.

4. The saddle-ride type vehicle according to claim 1, further comprising a switch box provided adjacent the handlebar grip on the handlebar,
wherein an end portion of the handlebar cover in the vehicle body width direction extends to a position where it is at least partially overlapped on the switch box as viewed in a front view of the vehicle, and wherein the lamp member is positionally set so as to be overlapped on at least a part of the switch box and the end portion of the handlebar cover in the vehicle body width direction, as viewed in the front view of the vehicle.

5. The saddle-ride type vehicle according to claim 1, wherein a portion of the mounting stay which projects outward from the handlebar cover linearly extends along a traveling direction of the vehicle as viewed in a plan view.

6. The saddle-ride type vehicle according to claim 1, wherein the opening portion of the handlebar cover is formed so as to be positioned in a lower forward direction relative to the handlebar.

7. The saddle-ride type vehicle according to claim 1 wherein the mounting stay comprises an arm portion having one end joined to the handlebar and the other end penetrating the opening portion and projecting in the vehicle body forward direction, and a supporting plate portion fixed to the other end of the arm portion and abutting on a side surface of the lamp member, and wherein a part of the supporting plate portion is configured so as to be overlapped on the handlebar cover as viewed in a plane view.

8. The saddle-ride type vehicle according to claim 7, wherein the arm portion comprises a rod-shaped member.

9. The saddle-ride type vehicle according to claim 1, further comprising a stay cover covering the portion of the mounting stay which projects in the vehicle body forward direction from the handlebar cover, the stay cover includes an end portion that tightly contacts an edge of the opening portion so as not to produce a clearance between the edge and the end portion and is wound toward a back surface of the handlebar cover.

10. The saddle-ride type vehicle according to claim 9, wherein the stay cover further comprising an end surface abutting the lamp member.

11. The saddle-ride type vehicle according to claim 7,
wherein the lamp member comprises a housing and a lens attached to a front portion of the housing; and wherein
a nut into which a bolt that penetrates the supporting plate portion of the mounting stay is threadedly fitted is integrally formed in the housing of the lamp member.

12. The saddle-ride type vehicle according to claim 9, wherein the stay cover comprises rubber.

13. The saddle-ride vehicle according to claim 9, further comprising a turn signal device harness which is connected at one end thereof to the lamp member, said having being wired inside the stay cover.

14. The saddle-ride vehicle according to claim 1, wherein the lamp member comprises a turn signal lamp.

15. A turn signal device of a vehicle, said turn signal device comprising:
lamp means for being selectively illuminated;
mounting means attached to said lamp means, said mounting means for mounting said lamp means, said mounting means being configured to be attached to a handlebar of the vehicle via a mounting stay which penetrates a handlebar cover.

16. The turn signal device according to claim 15, wherein said mounting means is configured to engage the mounting stay wherein the lamp means is deflected outward from a centerline of the vehicle.

17. The turn signal device according to claim 15, further comprising wiring means for enabling the lamp means to be connected to a switch unit disposed on the handlebar of the vehicle.

18. The turn signal device according to claim 15, wherein the lamp means includes a housing which is configured to be attached to a distal end of the mounting stay.

19. The turn signal device according to claim 15, further comprising a cover means which is configured to engage a housing of the lamp means when the lamp means is installed on vehicle, said cover means covering at least a distal portion of the mounting stay.

* * * * *